UNITED STATES PATENT OFFICE.

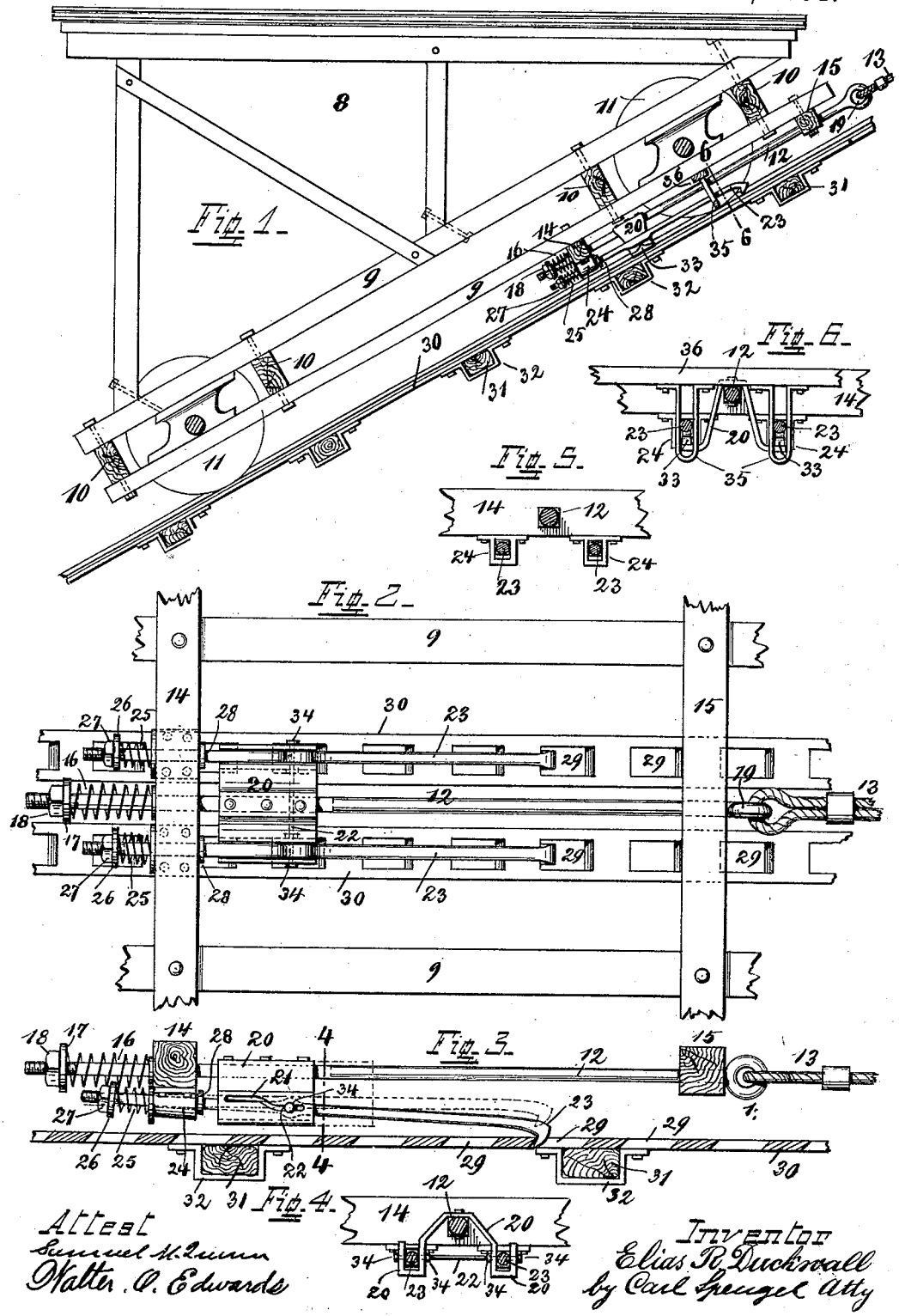

ELIAS R. DUCKWALL, OF BANTAM, OHIO.

AUTOMATIC SAFETY-STOP FOR INCLINED CABLE RAILWAYS.

SPECIFICATION forming part of Letters Patent No. 454,858, dated June 30, 1891.

Application filed February 24, 1891. Serial No. 382,364. (No model.)

*To all whom it may concern:*

Be it known that I, ELIAS R. DUCKWALL, a citizen of the United States, residing at Bantam, in the county of Clermont and State of Ohio, have invented certain new and useful Improvements in Automatic Safety-Stops for Inclined Cable Railways; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an automatic safety-stop to be used in connection with inclined cable railways for the purpose of stopping a moving car or truck instantly in case the cable should part or become loose from its fastenings. The actuation of this device is dependent on the cable, and it is kept inoperative while the cable is under strain or pulling, but becomes active the moment the cable ceases to pull—as in case of parting, for instance.

The special features of this invention are described in the following specification and illustrated in the accompanying drawings, in which—

Figure 1 is a side view of a truck, the wheels and rail nearest the observer being omitted. Fig. 2 is a top view of the device. Fig. 3 is a side view of Fig. 2, the stop-rail being shown in section. Fig. 4 is a section on line 4 4 of Fig. 3. Fig. 5 is a section through the hooks and draw-bar immediately in front of their bearings. Fig. 6 is a section on line 6 6 of Fig. 1. Figs. 2 to 6 are shown at an enlarged scale.

8 is a truck supporting a car, or it might represent the lower part of a car itself.

9 and 10 are longitudinal and cross timbers, respectively, of the truck-frame, and 11 are the wheels.

12 is the draw-bar connecting to the cable 13 and passing through two cross-timbers 14 15, by which it is held in position.

The arrangement and construction of the parts so far described may vary in different systems, but are easily changed to accommodate the attachment of my device. As will be seen, the rear end of the draw-bar passes through and extends beyond timber 14 and is encircled by a coil-spring 16, confined between said timber and a stop 17, held upon the end of draw-bar 12 by means of a nut 18. When the truck is at rest and the cable not pulling, spring 16, by its expansive force, moves draw-bar 12 some distance rearwardly, as shown in Fig. 2. The eye 19 at the forward end of the draw-bar, being larger than the hole in timber 15, through which the draw-bar passes, prevents the latter from passing out from its position. A cam 20, having oblique slots 21 in its vertical parts, is rigidly secured to draw-bar 12, its slots being occupied by a pin 22, passing through two hooks 23. These hooks are held in bearings 24, secured to timber 14, and, extending out rearwardly, are encircled by coil-springs 25, held in place by stops 26 and nuts 27 in the same manner as in the case of the draw-bar. A shoulder 28, secured to the shank of each hook, limits the action of the springs 25 and prevents said hooks from being pulled too far rearwardly. Bearings 24 are widened in one direction, (vertically,) so as to permit the hooks to go through a limited movement toward or from the track. Those parts of the draw-bar and the hooks passing through the timber or through the bearings thereon and those portions of the former supporting the cam are preferably square to prevent them from turning out of their proper positions. This vertical movement of the hooks is controlled by cam 20 through the intervention of the slots therein and pin 22, which passes through all.

Before the car or truck starts up draw-bar 12 is pulled out first to the limit of the expanded coil-spring 16, and while going through this movement raises hooks 23 by means of the slotted cam. The hooks remain in this position as long as the draw-bar is held in its corresponding forward position by the pulling of the cable. (See Fig. 1 and dotted lines in Fig. 3.) As soon as the cable slackens from any cause whatsoever, be it a stop at the end of the track or a break, the expansive pressure of the compressed spring asserts itself, forces the now released draw-bar with its cam back, and drops the hooks, as shown most plainly in Figs. 2 and 3. When down, these latter are capable of engagement with the sockets 29 of stop-rails 30, secured to cross-ties 31 vertically below the hooks by means of stirrups 32.

In this manner the downward progress of the truck is arrested at once and before it has had time to gain any momentum. The engagement of the hooks being rather sudden, especially in case of a break, springs 25 are provided for the purpose of lessening the shock and preventing breakage of any of the parts.

Pin 22 reaches through the four slots 21 in cam 20 and is provided with shoulders 34, thereby serving as a brace for the cam, as shown in Fig. 4, and preventing lateral displacement of the hooks, which might cause them to miss the stop-rails.

The means for operating the hooks 23 may be modified, as shown in Figs. 1 and 6, where inclined planes 33 are secured to the cam and engage with correspondingly-shaped surfaces on the hooks. In this case loop-shaped guides 35, depending from a cross-timber 36, serve to confine the movement of the hooks to one in a vertical plane and prevent them from missing the stop-rails. These guides 35 prevent, also, the hooks from dropping too far and acting as an obstruction during the ascent of the car should they lose their support on cam 20 or otherwise become disengaged. In order to provide for such a contingency, the ends of the hooks and the upper edge of the recesses in the stop-rails have been beveled, as most plainly shown in Fig. 3, which facilitates the passage of the former over the latter.

By reversing the parts and their movements—that is, by setting the stop-rails up on edge and having the hooks moving in a horizontal plane toward and from the stop-rails—the same results may be attained. Where an extraordinary degree of safety is desirable, draw-bar 12 may be of sufficient length and two or more sets of hooks may be provided, all of which operate simultaneously.

Having described my invention, I claim as new—

1. An automatic safety-stop for inclined cable railways, consisting of a movable draw-bar to which the cable connects and encircled by a coil-spring which counteracts the pull of the cable, movable hooks secured by their rear ends to the truck-frame, suitable mechanical means connected to the draw-bar for the purpose of operating said hooks, stop-rails 30, located within reach of the hooks, and guides 35, limiting the movement of the hooks, so as to prevent them from missing the stop-rails, all substantially as shown and described.

2. An automatic safety-stop for inclined cable railways, consisting of a movable draw-bar to which the cable connects and encircled by a coil-spring which counteracts the pull of the cable, movable hooks secured by their rear ends to the truck-frame, a cam provided with inclined surfaces or slots connected to the draw-bar for the purpose of operating said hooks, and stop-rails 30, located within reach of the hooks, all substantially as shown and described.

3. An automatic safety-stop for inclined cable railways, consisting of a movable draw-bar to which the cable connects and encircled by a coil-spring which counteracts the pull of the cable, movable hooks secured by their rear ends to the truck-frame, a cam provided with inclined surfaces or slots connected to the draw-bar for the purpose of operating said hooks, a pin passing through the hooks and cam, bracing the latter, and preventing displacement of the former, and stop-rails 30, located within reach of the hooks, all substantially as shown and described.

In testimony whereof I affix my signature in presence of two witnesses.

ELIAS R. DUCKWALL.

Witnesses:
   WALTER O. EDWARDS,
   SAMUEL M. QUINN.